Feb. 18, 1958 V. P. GIBNEY 2,823,738
FUEL FEED GOVERNOR FOR GAS TURBINE ENGINES
Filed April 12, 1951 2 Sheets-Sheet 1

INVENTOR.
VINGENT P. GIBNEY
BY
ATTORNEY

Feb. 18, 1958 V. P. GIBNEY 2,823,738
FUEL FEED GOVERNOR FOR GAS TURBINE ENGINES
Filed April 18, 1951 2 Sheets-Sheet 2

INVENTOR.
VINCENT P. GIBNEY
BY
ATTORNEY

United States Patent Office 2,823,738
Patented Feb. 18, 1958

2,823,738

FUEL FEED GOVERNOR FOR GAS TURBINE ENGINES

Vincent P. Gibney, South Bend, Ind., assignor to Bendix Aviation Corporation, South Bend, Ind., a corporation of Delaware Application April 18, 1951, Serial No. 221,679

2 Claims. (Cl. 158—36)

This invention relates to a fuel control device for engines, particularly for gas turbine engines of the type commonly used in aircraft. The ultimate aim in a control for such engines is to enable a pilot or operator to accelerate and decelerate to selected speeds or loads at will with maximum engine efficiency and without producing dangerously high temperatures in the burner system upon acceleration, or burner failure or dieout upon deceleration. Ordinarily the flow of air to the burners of a gas turbine engine driving a compressor is a substantially linear function of engine speed and the rate of fuel feed may, therefore, be a function of or proportional to engine speed subject to correction for changes in entering air density. A fuel feed and power control device which effectively operates to maintain the rate of fuel feed within predetermined temperature limits as a function of engine speed is disclosed in the copending applications of Frank C. Mock, Serial No. 596,620, now Patent No. 2,581,276, and 716,154, now Patent No. 2,689,606, filed May 30, 1945 and August 29, 1946, respectively, and assigned to the assignee of the present application.

In engines having certain characteristics, however, there is a tendency to surge and even stall at certain speeds, and it then becomes necessary to so regulate the rate of fuel feed as to avoid the surge region, and such rate usually does not conform to an upper temperature limit throughout the acceleration range. Thus, it may be necessary to feed fuel at a predetermined rate until the engine has attained a given speed and then more or less abruptly increase the rate.

An object of the present invention is to provide a fuel control device particularly adapted for gas turbine engines for aircraft and utilizing an all-speed governor type throttle valve wherein the pilot may set the governor for maximum or near maximum engine speed, and thereafter the rate of fuel feed will increase along a predetermined acceleration curve until the engine reaches the selected speed. More specifically, the invention contemplates an all-speed governor fuel regulator utilizing a centrifugal control on the governor valve which will predetermine the rate of fuel feed during acceleration of the engine irrespective of how suddenly the pilot may reset the governor.

The foregoing and other objects and advantages will become apparent in view of the following description taken in conjunction with the drawings, wherein.

Figure 1:
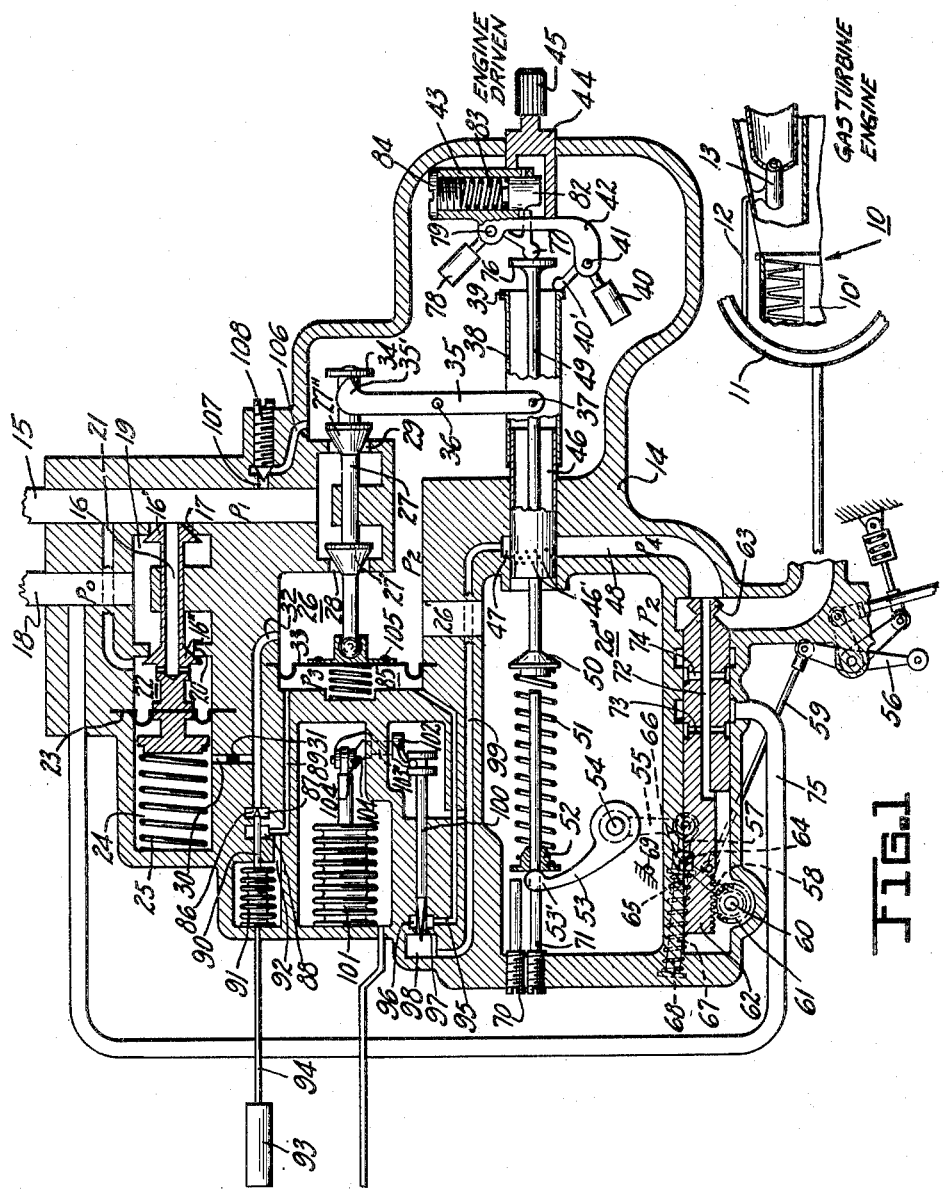
Figure 1 is a schematic view of a fuel control device in accordance with the invention.

In Figure 1, a gas turbine engine is generally indicated at 10; it has a combustion chamber or chambers which are supplied with air by means of a compressor 10', and with liquid fuel from a control device to be described by way of a fuel manifold 11, pipe 12 and burner nozzle or atomizer 13. The fuel is ignited upon discharge, and the expanded air and products of combustion are directed through a turbine, not shown, which drives the compressor, the remaining unexpended energy being used either for jet thrust or for driving a propeller or for both, depending upon the particular type of aircraft engine involved.

The fuel control proper comprises a main body or casting 14, formed with an inlet conduit 15, to which fuel is supplied under ($P_1$) pressure from a suitable source such as a fuel tank, not shown, by means of a pump, also not shown, which in the present instance is assumed to be of the by-pass type, the delivery system including a by-pass valve 16 having a valve member 16' controlling a port 17, which communicates passage 15 with return conduit 18 by way of a chamber 19, the passage 18 leading back to the low pressure ($P_0$) side of the pump. The valve 16 is of the balanced type, having a companion valve member 16" controlling a port 20, which also communicates inlet passage 15 with return passage 18 by way of a passage 21, chamber 22 and chamber 19. Chamber 22 is also vented to $P_1$ pressure through the hollow interior of valve 16. Since the exposed portions of valve members 16' and 16" are of substantially the same effective area and are subjected to the same pressure, they will balance one another and the valve will respond solely to the differential across diaphragm 23, which is the resultant of $P_1$ pressure in chamber 22, minus $P_2$ or unmetered fuel pressure in chamber 24 plus the force exerted by spring 25. This so-called unmetered fuel pressure is that of the fuel in regulator chamber 26, to which fuel flows from inlet passage 15 across a regulator valve 27, said latter valve being also of the balanced type, having companion valve members 27' and 27" controlling ports 28 and 29, which communicate inlet passage 15 with regulator chamber 26. Chamber 24 is vented to chamber 26 by way of passage 30, having a calibrated diaphragm damping jet or restriction 31 therein, and passage 32. It will be seen that since chamber 24 is vented to unmetered or $P_2$ pressure, the supply or $P_1$ pressure will always be maintained at a predetermined value above $P_2$ pressure as determined by the force of spring 25, which represents a constant.

The regulator valve 27 is responsive to the differential across diaphragm 33, which is a function of engine speed. The outer or right-hand end of the valve 27 is provided with a boss or collar 34, which is engaged by the forked end 35' of a lever 35, fulcrumed at 36 and having its opposite end pivotally connected at 37 to a sliding sleeve 38. The right-hand end of sleeve 38 is formed with an annular flange or boss 39, which is engaged by the inner end or foot 40' of a centrifugal speed-sensing weight 40, pivoted at 41 to a bracket 42, which is shown as formed integral with a cylinder 43, secured to and rotatable with a hollow shaft 44, provided with a driving spline or pinion 45, by means of which it may be driven in relation to engine speed.

A throttle or governor valve is indicated at 46; it is in the form of a hollow sleeve formed with a plurality of feed restrictions or orifices 46', which are calibrated to obtain a predetermined flow area for a given position of the valve with respect to annular port or chamber 47, which opens into metered fuel ($P_4$ pressure) passage 48. The sleeve 46 is secured to and moves with a rod 49, which at its left-hand end is formed with a boss 50, engaged by the one end of a governor spring 51, the opposite end of said spring being provided with a slidable abutment 52, engaged by the forked end 53' of a lever 53, secured on a shaft 54. Also secured on the same shaft is an arm or lever 55, which is operatively connected to a pilot's control lever 56 (or a lever adapted for connection to a pilot's control lever) through a link 57, arm 58 and link rod 59. Arm 58 is secured on a shaft 60, mounting a pinion 61, having its teeth in mesh with those formed on the rack section 62 of a cut-off valve 63. The upper or outer end of arm 58 is connected to link 57 by means of a pin or short shaft 64, projecting through an elongated slot 65, formed in a short sleeve 66, slidable on a swinging link rod 67 against the resistance of a spring 68, the said rod 67 being also formed with a slot complementary to slot 65. A stop 69 limits movement of lever or arm 55 in a direction tending to increase the setting of the governor valve 46 and hence the approximate maximum engine speed, while an adjustable screw 70 determines the minimum idle setting of the said valve. The reason for the lost motion connection between arm 58 and arm or lever 55, is to permit further rotation of the pilot's lever 56 after arm 55 contacts stop 69, so that if the said lever 56 is used to control other devices, such as an exhaust jet area valve, its controlling action will not be too restricted.

A rod 71 provides a guide for the slidable boss 52 and it also serves as an adjusting screw for determining the minimum flow position of the governor valve 46.

The cut-off valve 63 is formed with a central passage 72 and cross ducts 73 and 74 for venting $P_4$ pressure to the low pressure side of the pump by way of conduit 75 when the said valve is closed.

Figure 2:
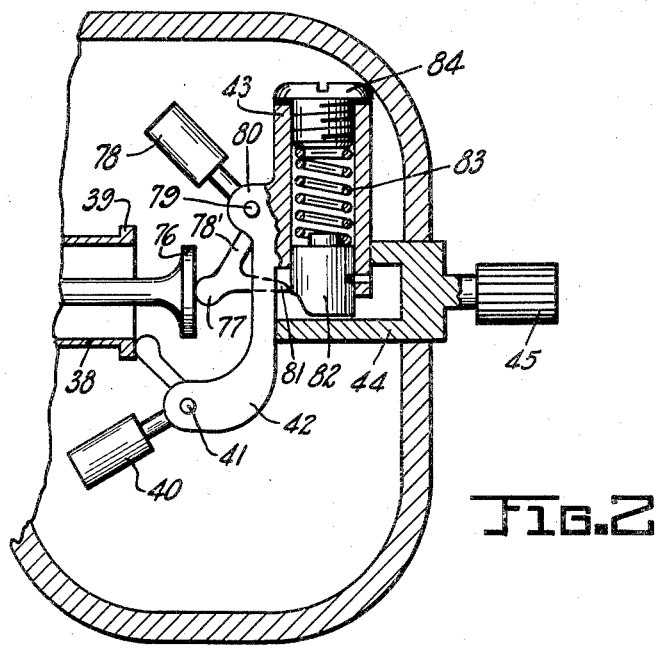
Figure 2 is an enlarged view of the governor and fuel enrichment weights and coacting parts.

The primary feature of the instant invention is the centrifugal weight arrangement (shown enlarged in Figure 2) for automatically regulating the effective flow area of the governor or throttle valve when the pilot resets the governor by compressing the governor spring 51 when accelerating from some low or idle speed to a maximum or near maximum engine speed. The right-hand end of the valve rod or shaft 49 is formed with an annular boss or abutment 76, the outer bearing face of which is engaged by a shoe 77, formed on the end of the lever portion or arm 78' of a governor weight 78, said lever portion being fulcrumed or pivoted at 79 in a boss 80 formed on the adjacent wall of the cylinder 43. Also formed on said lever portion 78' is a foot 81, adapted to engage the effective or cam surface of a centrifugal weight 82, mounted to slide in the open end portion of the cylinder 43 against the resistance of a calibrated spring 83. A threaded and shimmed cap 84 serves as a retainer for said spring and also provides for adjustment. In the position of the governor valve 46 and coacting parts as shown in Figure 1, it may be assumed that the rate of fuel feed is such as to produce a low or idling engine speed. Should the governor spring 51 now be compressed by rotating lever 53 clockwise, the valve 46 will open until the foot 81 engages the cammed surface of weight 82. The engine speed will then increase gradually until centrifugal force causes the said weight 82 to move outwardly and clear the foot 81, allowing the governor valve 46 to move further open, whereupon there will be a relatively sharp increase in the rate of fuel feed and the governing action will be determined by the weight or weights 78. Upon deceleration, the action of the weight 82 is so coordinated with that of the weight 78 as to cause the foot to clear the path of weight 82 at a predetermined decreasing engine speed. The operation of the governor as a whole will be more fully hereinafter explained. In the schematic view of Figures 1 and 2, while only one regualtor weight 40 and governor weight 78 is shown, it will be obvious that these weights may be arranged in pairs or any number thereof used as desired and found expedient.

There remains to be described the density compensating circuit, and altitude idle circuit and coacting components, and while these form no essential part of the present invention except as to any cooperative relation that may exist therebetween and the predetermining enrichment governor valve assembly, it is necessary that an understanding thereof be had to provide a basis for an intelligible description of operation of the fuel control device as a whole.

Density compensating circuit: the basic principles of this circuit are illustrated, described and claimed in the copending application of Frank C. Mock, Serial No. 620,755, filed November 6, 1945 (common assignee), now Patent No. 2,644,513.

The diaphragm 33 forms a movable wall between chamber 26 ($P_2$ pressure) and a chamber 85 ($P_3$ or so-called compensating pressure). Chamber 26 communicates with chamber 85 by way of passage 32, variable orifice 86, chambers 87, 88 and passage 89. The effective area of orifice 86 is controlled by a needle valve 90, connected to the free end of a bellows 91, which is vented to liquid fuel by way of a passage 92. Venting could also be had by providing clearance around the needle 90. A temperature sensing bulb is indicated at 93; it is connected to the bellows 91 by means of a capillary tube 94. Bulb 93, tube 94 and bellows 91 are filled with an incompressible temperature responsive liquid, such as normal butyl alcohol.

In prior known temperature sensing and compensating circuits for fuel control or analogous systems, employing a device such as a bellows which responds to changes in volume of a fluid to position a needle valve or like element, difficulty has been experienced in avoiding the effects of changes in temperature on the circuit other than changes in the absolute temperature of the air or other media being sensed. This difficulty can be greatly alleviated by mounting the bellows in a temperature insulated chamber, but here the problem becomes one of providing an effective and durable seal around the needle which controls the flow orifice. Such seal becomes unnecessary when the bellows is mounted in a chamber containing the fuel or fluid to be regulated, but in an installation of this type, changes in temperature of the fuel affect the bellows. The manner in which changes in temperature of the fuel are canceled out forms part of the inventive subject matter of a copending application Serial No. 222,001, filed April 20, 1951, now Patent No. 2,736,501, in the name of George M. Widell (common assignee).

The bulb 93 is so located as to respond to changes in compressor air inlet temperature, preferably the temperature of the air in the area of the third stage of an axial flow compressor where such type of compressor is involved, an increase in temperature causing needle 90 to restrict or reduce the area of orifice 86 and a decrease in temperature having the opposite effect. There is sufficient clearance between the needle and that portion of the passage between chambers 87 and 88 as to permit fuel to flow past the needle.

Chamber 85 communicates with the metered fuel discharge passage 48 ($P_4$ pressure) by way of passage 95, chamber 96, variable orifice 97, chamber 98, passage 99 and port 47. The orifice 97 is controlled by a needle valve 100, which is connected to the movable end of a pressure responsive bellows 101 by means of arm 102, shaft 103, and arm 104. Bellows 101 may be subjected to compressor air inlet pressure in the area of the third stage of the axial flow compressor 10'. It will be understood, however, that either one or both the bulb 93 and bellows 101 may be located at any suitable point to respond to selected temperatures and pressures instead of being responsive to compressor inlet temperature and ram or compressor inlet pressure.

Preferably, but not necessarily, the diaphragm 33 is provided with one or more jets 105, which provide a minimum or basic flow from chamber 26 to chamber 85 in the event the temperature needle 90 becomes stuck in the orifice 86. Normally, the temperature needle 90 never completely closes the orifice 86, but simply varies the effective area thereof. It will be seen that passage 26', chamber 26'', interior of throttle valve sleeve 46, and the ports 46' (the main flow circuit) constitute one flow passage from regulator chamber 26 to port 47, and that passage 32, orifice 86, chambers 86, 87, passage 89, chamber 85, passage 95, chamber 96, variable orifice 97, chamber 98, and passage 99, constitute another flow passage (the density circuit) in parallel with said first named flow passage; and since the pressures at opposite ends of said passages are equal, the pressure drop across the respective passages will be equal at a given engine speed and entering air pressure and/or temperature. The fuel pressure differential across the regulator diaphragm 33 is the result of the action of the centrifugal head generating weights 40, and this differential, applied to the effective diaphragm area, provides a force which is always equal to and balances the force set up by said weights. Hence the fuel pressure differential across the diaphragm 33 and the density control circuit flow will vary with engine speed. All flow through the density circuit must pass through the pressure orifice 97 which is in series with the diaphragm jets 105. Should there be a change in the position of the temperature needle 90 or the pressure needle 100, the effective areas of the orifices 86 and/or 97 will be varied and this will momentarily vary the $P_2-P_3$ differential across the diaphragm 33, or upset the force balance of the regulator, whereupon the regulator valve 27 will move towards open or closed position and the rate of fuel feed will either increase or decrease to a point where the fuel pressure differential $P_2-P_3$ is again in balance with the force produced by the centrifugal weight or weights 40. Thus, the density circuit constitutes a bleed off the main flow circuit and senses the pressure differential across the governor valve 46 in order to correct the position of the regulator valve 27 for variations in pressure and/or temperature of the air flowing to the engine. Also, at any given engine speed as determined by the setting of the governor or pilot's control lever, the position of the governor valve 46 will remain substantially constant irrespective of changes in entering air pressure and/or temperature, but fuel flow will still vary in relation to such changes due to a variation in the fuel metering head. Should the governor valve 46 open or close to maintain a selected engine speed, the regulator valve 27 will open or close to maintain the fuel pressure differential across the governor valve for that particular speed.

It is sometimes desirable to have a minimum or predetermined amount of uncompensated flow of metered fuel to the engine to avoid possible power failure and/or acceleration lag when the pilot throttles back at high altitude. This is accomplished in the present instance by a passage 106 communicating the inlet passage 15 with the $P_2$ pressure chamber 26, said passage being provided with an orifice 107, the effective area of which is adjustable by means of a valve 108. This passage 106 by-passes the regulator valve 27, so that irrespective of the position of the said latter valve at altitude, there will always be a minimum supply of fuel or $P_2$ pressure to the throttle valve 46.

*Operation*

In starting a gas turbine engine, suitable cranking means is provided to bring the engine up to a point where it attains a self-sustaining speed. In the position of the parts as schematically illustrated in Figure 1, it may be assumed that the engine is operating at idle speed at ground level. Fuel flows to the regulator valve 27 by way of conduit 15 at $P_1$ pressure as determined by the setting of the by-pass valve spring 25, then across the regulator valve to chamber 26, passage 26' and chamber 26", into the hollow governor valve 46 and thence through the metering orifices 46' to passage 48, fuel manifold 11 and fuel lines 12 to the burner nozzles 13. A limited quantity of fuel will also flow through the density control circuit to the metered fuel passage 48 in the manner heretofore described, this flow (compensating pressure $P_3$) by-passing the throttle valve 46.

The governor or throttle valve 46 is the prime control of fuel to the engine; it is positioned by the pilot's control lever, who selects the desired engine speed. For every power lever position, there is a definite force set up by the governor spring 51 tending to open the governor or throttle valve 46, and for every engine speed there is a definite thrust force set up by the governor weights 78 tending to close the said valve. When the pilot sets his throttle, the valve 46 will automatically seek a position of equilibrium, at which time the thrust force from the governor weights 78 equals the force of the spring 51, and fuel is metered at a rate tending to maintain the engine speed constant.

Movement of the governor or throttle valve 46 by varying the loading of governor spring 51 in a direction causing an increase in the area of the metering restrictions 46' results in a momentary decrease in the drop across said valve and a corresponding decrease in the differential across the regulator diaphragm 33 (which differential opposes the thrust of the speed sensing weights 40), whereupon the regulator valve 27 moves towards open position and fuel flow increases to a point where the fuel head across the regulator diaphragm is in balance with the centrifugal weights 40. Then, as the engine speed increases, the head across the increased throttle valve area increases, thus increasing fuel flow to the engine and hence engine speed, until the force exerted by the governor weights 78 starts to balance the load on governor spring 51, whereupon the governor valve 46 moves in a closing direction to an equilibrium position. Movement of the throttle valve in a direction to restrict the flow of fuel results in an increase in throttle valve drop and corresponding increase in the differential across the regulator diaphragm 33, whereupon the regulator valve moves towards closed position and fuel flow decreases to a point where the fuel head is again in balance with the speed sensing weights 40.

During acceleration and deceleration, the metering head or differential across the governor or throttle valve 46 and hence the rate of fuel feed will also increase and decrease with changes in the pressure and/or temperature of the air flowing to the engine in the manner heretofore described.

Figure 3:
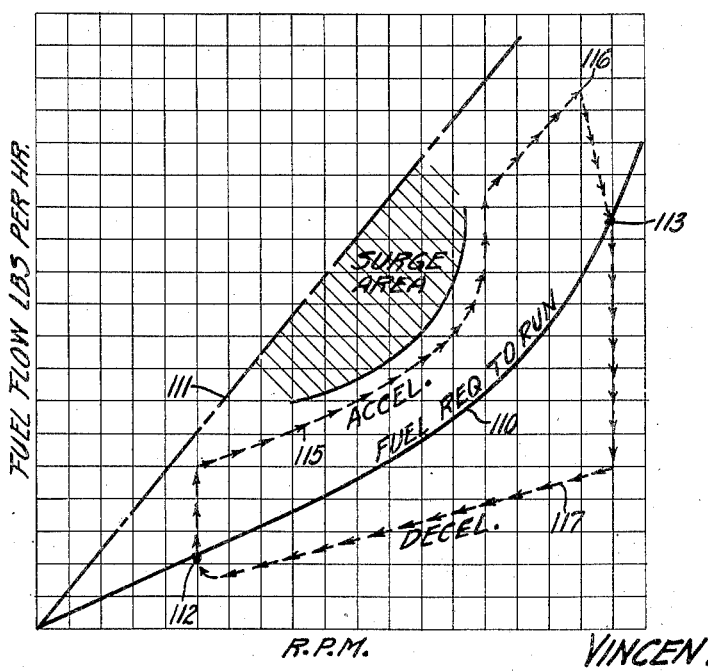
Figure 3 is a curve chart illustrating the operation of the control.

Referring to Figure 3, the curve charts plot fuel flow against engine speed, conditions being assumed to be at normal ground level pressure and temperature. The curve 110 represents the fuel feed required to run at various steady engine speeds, or a rate of fuel feed required to run the engine at given settings of the governor valve. The dot and dash line 111 represents the upper pumping limit as determined by the setting of the by-pass valve spring 25. If it be assumed that the engine is operating at point 112 and the pilot resets the governor spring 51 sufficiently to accelerate to point 113, then the fuel supplied during this period of acceleration will follow the arrows from 112 to 113. The initial increase in flow represented by the vertical arrows occurs as a result of the sudden increase in the effective area of the metering orifices 46' at the then existing speed. Although the governor spring 51 has been compressed to the limit determined by the setting of the pilot's control lever, the foot 81 of the lever 78' initially contacts the camming or contoured surface of the weight 82 which prevents further opening of the throttle valve at the then existing engine speed. Hence the rate of fuel feed gradually increases along the slope at 115 until it passes the surge area, whereupon the speed of the engine is such as to cause the centrifugal weight 82 to clear the foot 81, and from there on the governor spring 51 and coacting weights 78 become effective to produce an increase in the rate of fuel flow until point 116 is reached, whereupon the governor begins to cut off and the rate of fuel feed drops down to the point 113.

Should the pilot suddenly throttle back to the idle range, or from point 113 to point 112, the fuel feed rate will follow the arrows generally along the line as indicated at 117.

As the engine speed decreases, the centrifugal weight 82 moves inwardly and finally settles at a position approximately as shown in Figure 1 of the drawings.

From the foregoing, it will be seen that the pilot may reset his power lever from idle to a full throttle position, and the transient rate of fuel feed will automatically follow a predetermined pattern as determined by the centrifugal cam weight 82.

Although only one embodiment of the invention has been illustrated and described, various changes in the form and relative arrangement of the parts may be made to suit requirements.

I claim:

1. In a fuel feed system for an engine, a fuel conduit having a feed or metering restriction therein, a throttle valve for varying the effective area of said restriction to control the rate of fuel feed, an all-speed governor operatively connected to said valve and including a governor weight and a governor spring adapted to be variably preloaded to select an engine operational speed, a centrifugal weight in addition to said first-named weight also operatively associated with said governor weight and spring, and a contact member connected to said first-named governor weight and arranged to engage said second-named weight, when said governor spring is initially compressed to reset the governor for operation at a higher engine speed, to retard the effect of the spring.

2. In a fuel feed system for an engine, a fuel conduit having a metering restriction therein, a throttle valve for varying the effective area of said restriction, governor means connected to said valve including means adapted to be variably preloaded to select an engine operational speed, engine-speed responsive means arranged to oppose opening movement of said valve over a predetermined low engine speed range following preloading of said first-named means to accelerate the engine and to move out of opposing position in response to an increase in engine speed beyond said range, and means responsive to changes in engine speed and the pressure and/or temperature of the air flowing to the engine for automatically modifying the metering head across said restriction.

References Cited in the file of this patent

UNITED STATES PATENTS

| | | |
|---|---|---|
| 2,204,492 | Heintz | June 11, 1940 |
| 2,324,516 | Kalin | July 20, 1943 |
| 2,494,630 | Richmond | Jan. 17, 1950 |
| 2,515,074 | Bobier | July 11, 1950 |
| 2,557,526 | Bobier | June 19, 1951 |
| 2,612,944 | Orr | Oct. 7, 1952 |
| 2,616,507 | Greenland | Nov. 4, 1952 |
| 2,694,459 | Biermann | Nov. 16, 1954 |
| 2,720,751 | Kunz | Oct. 18, 1955 |

FOREIGN PATENTS

| | | |
|---|---|---|
| 113,845 | Great Britain | Mar. 11, 1918 |
| 934,814 | France | Jan. 19, 1948 |
| 958,905 | France | Sept. 21, 1949 |